United States Patent [19]

Daane

[11] Patent Number: 5,781,544
[45] Date of Patent: Jul. 14, 1998

[54] METHOD FOR INTERLEAVING NETWORK TRAFFIC OVER SERIAL LINES

[75] Inventor: John Daane, Saratoga, Calif.

[73] Assignee: LSI Logic Corporation, Milpitas, Calif.

[21] Appl. No.: 586,171

[22] Filed: Jan. 17, 1996

[51] Int. Cl.$^6$ ........................................ H04J 3/06
[52] U.S. Cl. ........................................ 370/389; 370/509
[58] Field of Search ........................ 370/105.4, 106, 370/112, 105.1, 82, 83, 389, 395, 520, 472, 471, 470, 498, 509, 510, 512, 513, 535, 542, 366; 375/355, 363

[56] References Cited

U.S. PATENT DOCUMENTS

| | | | |
|---|---|---|---|
| 4,048,445 | 9/1977 | Ghisler | 370/248 |
| 4,071,887 | 1/1978 | Daly et al. | 364/200 |
| 4,271,513 | 6/1981 | Maejima et al. | 371/22 |
| 4,308,472 | 12/1981 | McLaughlin | 307/518 |
| 4,419,633 | 12/1983 | Phillips | 331/77 |
| 4,486,739 | 12/1984 | Franaszek et al. | 340/347 |
| 4,564,933 | 1/1986 | Hirst | 370/249 |
| 4,573,017 | 2/1986 | Levine | 328/155 |
| 4,575,841 | 3/1986 | Fagerstedt et al. | 370/248 |
| 4,575,864 | 3/1986 | Rice, Jr. et al. | 375/368 |
| 4,613,979 | 9/1986 | Kent | 375/357 |
| 4,631,719 | 12/1986 | Huffman et al. | 370/15 |
| 4,675,886 | 6/1987 | Surie | 375/368 |
| 4,748,623 | 5/1988 | Fujimoto | 370/513 |
| 4,751,469 | 6/1988 | Nakagawa et al. | 328/133 |
| 4,806,878 | 2/1989 | Cowley | 331/1 A |
| 4,908,819 | 3/1990 | Casady et al. | 370/15 |
| 4,920,546 | 4/1990 | Iguchi et al. | 375/354 |
| 4,975,916 | 12/1990 | Miracle et al. | 371/47.1 |
| 4,979,185 | 12/1990 | Bryans et al. | 375/20 |
| 4,988,901 | 1/1991 | Kamuro et al. | 307/518 |
| 5,010,559 | 4/1991 | O'Connor et al. | 375/116 |
| 5,025,458 | 6/1991 | Casper et al. | 375/114 |
| 5,028,813 | 7/1991 | Hauck et al. | 307/269 |
| 5,040,195 | 8/1991 | Kosaka et al. | 375/114 |
| 5,043,931 | 8/1991 | Kovach et al. | 364/579 |
| 5,052,026 | 9/1991 | Walley | 375/119 |
| 5,111,451 | 5/1992 | Piasecki et al. | 370/29 |
| 5,126,690 | 6/1992 | Bui et al. | 331/1 A |
| 5,159,279 | 10/1992 | Shenoi et al. | 328/109 |
| 5,180,993 | 1/1993 | Dent | 331/16 |
| 5,251,217 | 10/1993 | Travers et al. | 370/538 |
| 5,265,089 | 11/1993 | Vonehara | 370/15 |
| 5,268,652 | 12/1993 | Lafon | 331/1 A |
| 5,274,668 | 12/1993 | Marschall | 375/10 |
| 5,299,236 | 3/1994 | Pandula | 375/116 |
| 5,327,103 | 7/1994 | Baron et al. | 331/1 A |
| 5,337,306 | 8/1994 | Hall | 370/13 |
| 5,343,461 | 8/1994 | Barton et al. | 370/13 |
| 5,353,250 | 10/1994 | McAdams | 365/189 |
| 5,379,409 | 1/1995 | Ishikawa | 395/183.13 |
| 5,398,270 | 3/1995 | Cho et al. | 377/39 |
| 5,448,571 | 9/1995 | Hong et al. | 370/105 |
| 5,473,758 | 12/1995 | Allen et al. | 395/430 |
| 5,481,543 | 1/1996 | Veltman | 370/112 |
| 5,559,854 | 9/1996 | Suzuki | 379/27 |
| 5,577,039 | 11/1996 | Won et al. | 370/112 |

*Primary Examiner*—Dang Ton
*Attorney, Agent, or Firm*—Kevin L. Daffer; Conley, Rose & Tayon

[57] ABSTRACT

A method (30) for interleaving a plurality of formatted data streams (10) on a network (20) wherein the formatted data streams (10) are divided into a further plurality of time bites (44) and synch characters (48) are added thereto in an add synch character operation (46). The time bites (44) are then transmitted as am assembled serial data stream (39) in a serializer (31). In a deserializer (32) the time bits (44) are reconstituted into the separate individual formatted data streams (10).

13 Claims, 3 Drawing Sheets

METHOD FOR INTERLEAVING NETWORK TRAFFIC OVER SERIAL LINES

TECHNICAL FIELD

The present invention relates to the field of electronic data communications, and more particularly to an improved method and means for transferring data between computer devices at an increased rate while using a minimal amount of hardware and other resources. The predominant current usage of the present inventive interleaving method will be in the transmission of data over computer networks, and the like.

CROSS REFERENCES TO RELATED APPLICATIONS

This application is being filed generally concurrently with the following applications, and these are incorporated herein by reference. U.S. patent application Ser. No. 08/586,173 filed on Jan. 17, 1996 for a WRAP BACK TEST SYSTEM AND METHOD; U.S. patent application Ser. No. 08/596,816 filed on Feb. 5, 1996 for a FAST SYNCHRONIZATION METHOD; U.S. patent application Ser. No. 08/597,896 filed on Feb. 5, 1996 for a HIGH SPEED PHASE LOCKED LOOP TEST METHOD AND MEANS; U.S. patent application Ser. No. 08/597,015 filed on Feb. 5, 1996 for a SELF TEST OF CORE WITH UNPREDICTABLE LATENCY; and U.S. patent application Ser. No. 08/596,987 filed on Feb. 5, 1996 for a PROGRAMMABLE SYNCHRONIZATION CHARACTER.

BACKGROUND ART

As many new applications are discovered and developed for computers and, particularly, for computers cooperating in a network or other communicative relationship, it has become a nearly universal objective to increase the data transfer rate between computers so as to accommodate all of these uses and further make such uses more convenient by reducing or eliminating the time required to accomplish the required tasks.

A typical prior art solution has been to have multiple separate connections, as between boards in a hub or router, between computers, hubs and/or routers, or the like. However, this solution requires multiple transceivers and one cable for each individual data line. This approach generally requires a great deal of circuit board space and cabling and is, overall, quite costly.

Another solution using existing technology would be to multiplex together several data streams over a high speed parallel bus, such as PCI. PCI can be either 32-bit or 64-bit today, operating at 32 MHz or 64 MHz, thereby yielding approximately 1 Gbs to 4 Gbs performance. However, parallel busses require more extensive PCB and system backplane design, add material cost, and require more complex cabling between boards and systems.

Another solution known in the art is to multiplex data streams together by converting data to a higher performance transmission format. For example, four 155 Mbs ATM streams could be converted from SONET frames to the native ATM 53 byte cell format, then multiplexed together, and then converted back to a single SONET frame for transmission. The receiving computer would have to go through this process in reverse to recover the four distinct 155 Mbs lines in their SONET format. These extra processing steps would increase system latency and add cost to the system. This solution would also require additional logic for the conversion, thereby further increasing the cost. This solution is illustrated in the diagram of FIG. 1. As can be seen in the view of FIG. 1, this prior art solution has multiple formatted data streams 10. In this example, the multiple data streams 10 are each independently converted to a common format at a first data conversion operation 12 with a modified data stream 14 resulting from such operation. (In the present example, the first data conversion operation 12 converts the formatted data streams 12 from SONET frames to ATM53 format. Next the modified data streams 14 (in the present example, in ATM53 format) are combined in a combination operation 16 (as illustrated by a multiplexor in FIG. 1) into a combined data stream 18 and the combined data stream is transmitted through a network 20. The preceding operations constitute a transmitting end operation series 22, and a receiving end operation series 24 is essentially the reverse thereof. The combined data stream 18 is separated into its constituent components in a separation operation 26 (as in a demultiplexor) into reconstituted separate modified data streams 14 and the individual modified data streams 14 are each individually converted in a plurality of second data conversion operations 28 into the separate formatted data streams 10 which in the same format as originally constituted. As convoluted and complicated as this process seems, it is presently practiced as a state of the art network data transmission method.

It would be advantageous to have a method or system for high speed data communications which would be inexpensive to produce and to operate, which would not significantly increase system latency, and yet which would significantly increase overall data transmission rates over that which is available through the conventional data transmission methods and means. However, to the inventors knowledge all prior art methods either require additional expensive hardware and/or transmission lines, or else introduce considerable system latency due to required processing time, or both.

DISCLOSURE OF INVENTION

Accordingly, it is an object of the present invention to provide an improved data transmission method.

It is another object of the present invention to provide a data transmission method which will increase the bandwidth of data transmission without greatly increasing cost.

It is still another object of the present invention to provide a data transmission method which will increase the bandwidth of data transmission without greatly increasing system latency.

It is yet another object of the present invention to provide a data transmission method which is applicable to both long and short data links.

It is still another object of the present invention to provide a data transmission method which does not add significantly to system overhead.

It is yet another object of the present invention to provide an improved method and means for data communications which is generally independent of data format.

It is still another object of the present invention to provide an improved method and means for communicating data between computers, computer peripherals, computer components, and essentially any other devices which transmit or receive digital information.

Briefly, the preferred embodiment of the present invention is a method adapting a high performance serial transmission medium to transfer multiple streams of networking protocol data, such as 10 Mbs or 100 Mbs Ethernet, 4 Mbs or 16 Mbs Token Ring, 100 Mbs FDDI or CDDI or 155 Mbs ATM between sites such as routers, hubs, servers, workstations, or PCS—or within networking systems such as a board to board communication device.

A high speed communication transmission medium, which can transmit data at up to 700 Mbs full duplex (higher rates are anticipated in the future) by combining data streams (either parallel data streams or convergent serial data streams) into aseries of serial transmissions. Unlike conventional methods, data format is not affected, since serialization and deserialization of the data is dependant only upon cooperation of the serializing and deserializing hardware to identify the time slices associated with respective data portions.

An advantage of the present invention is that data communication speed is greatly increased.

A further advantage of the present invention is that many different types of hardware, using many different types of data protocols can be interfaced according to the inventive method.

Yet another advantage of the present invention is that system overhead is not significantly increased.

Still another advantage of the present invention is that system latency is not significantly increased.

Yet another advantage of the present invention is that it is inexpensive to implement.

Still another advantage of the present invention is that it is reliable in that data communication and retrieval is accomplished with a minimum of errors and any such errors as do arise are readily detected and corrected.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT THE INVENTION

Figure 2:
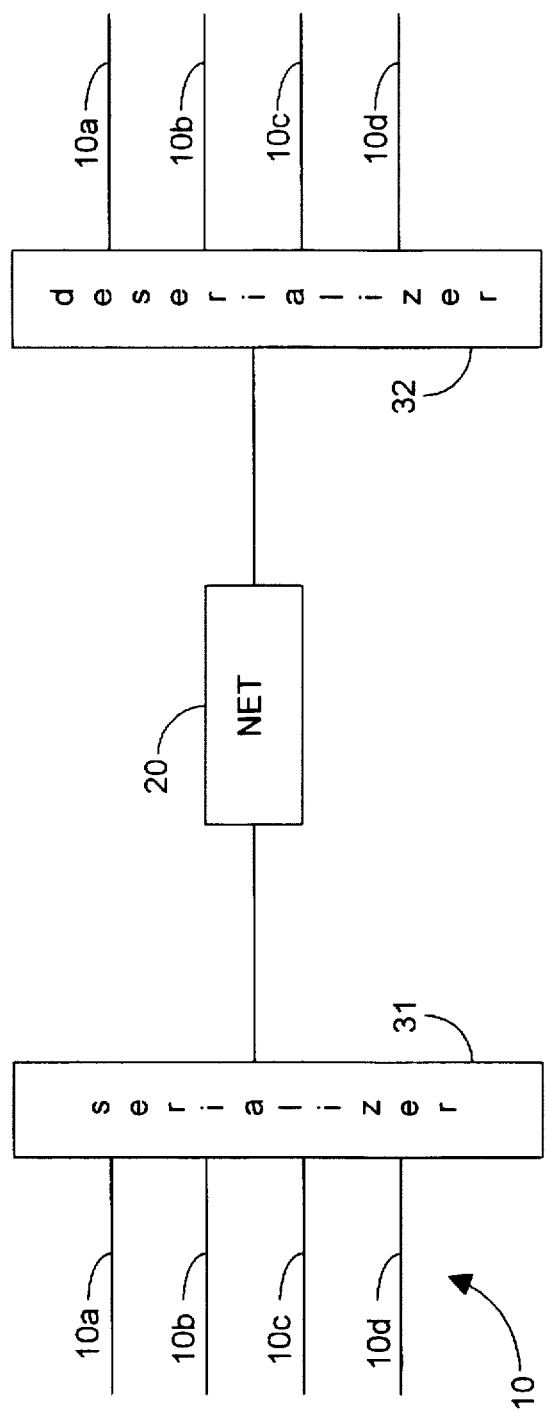
FIG. 2 is a diagrammatic representation, similar to the view of FIG. 1, depicting the present inventive reduced operation method for combining data streams over a serial network.

The following detailed description illustrates the invention by way of example, not by way of limitation of the principles of the invention. The best presently known mode for carrying out the invention is a method for data transmission which will combine data for transmission over a serial data link and then separate the data at the receiving end. The inventive method for interleaving network traffic over serial links Is depicted in the diagram of FIG. 2 and flow chart of FIG. 3 and is designated therein by the general reference character 30. The interleaving method 30 operates on a plurality of formatted data streams 10, designated in the view of FIG. 2 as 10a, 10b, 10c and 10d. It should be noted that the quantity (four) of data streams 10 is not particularly relevant to the present invention, except that it is anticipated that there will be some limit to the quantity according to the particular hardware utilized to implement the inventive method. It should further be noted that it is specifically not necessary to the practice of the present invention that each of the data streams 10 be formatted in like manner to the others. Indeed, unlike prior art methods, the present inventive method 30 is essentially independent of the format of the data streams 10 or, at a minimum, is adaptable to accommodate essentially any format(s) in which the data streams might occur.

Figure 1:
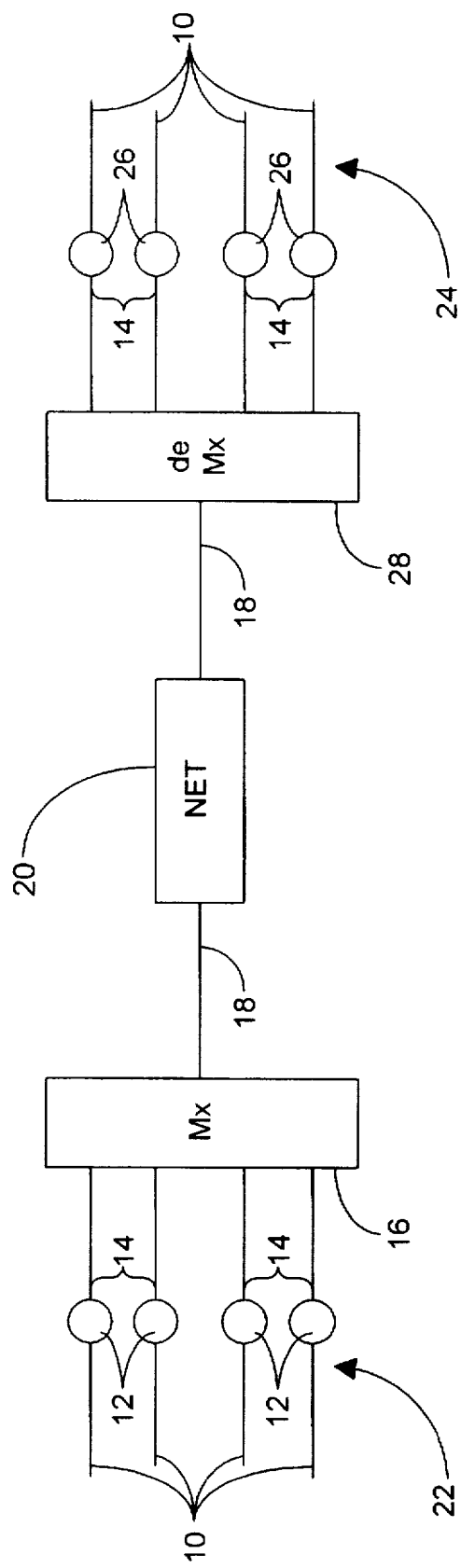
FIG. 1 is a diagrammatic representation of a prior art method for sending multiple data streams over a serial network connection, over which the present invention is intended to be an improvement in at least many applications.

As can be seen in the view of FIG. 2, the inventive interleaving method 30 is much simpler than the prior art method depicted in FIG. 1 and will, therefore, require less hardware and less computing power, and will result in less latency as compared to the prior art method. In the inventive interleaving method 30, the formatted data streams 10 pass through a serializer 31 and a deserializer 32.

Figure 3:
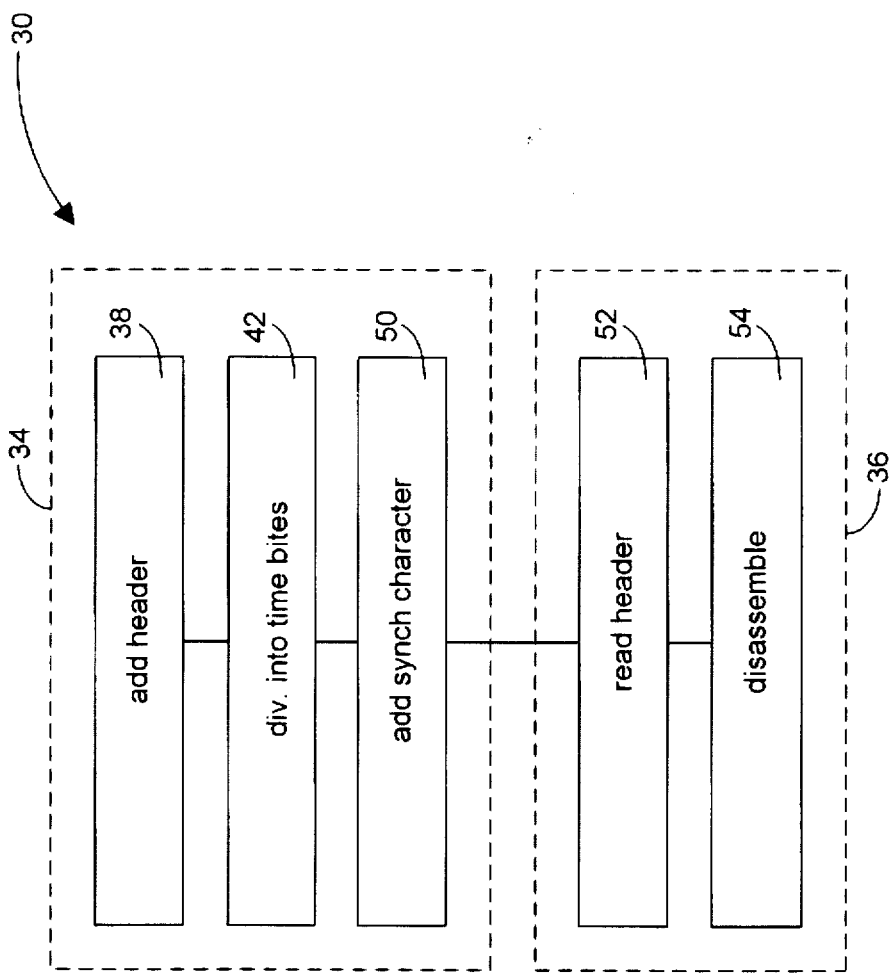
FIG. 3 is a flow chart depicting the present inventive method.

Referring now to the flow chart of the inventive interleaving method 30 in FIG. 3, a serialize operation 34 depicts the operations within the serializer 31, and a deserialize operation 36 depicts the operations within the deserializer 32. Within the serialize operation 34 is an optional add header operation 38. It is anticipated that the add header operation 38 will generally not be used. However, for the sake of completeness it is included here. The add header operation 38 will be reserved for those operations wherein a receiving unit will have to be "set up" to receive a particular data stream to follow because of some particular (not specifically anticipated) characteristics of the data to follow. Such variations will be discussed in more detail hereinafter in relation to the industrial applicability of the inventive interleaving method 30.

Figure 4:
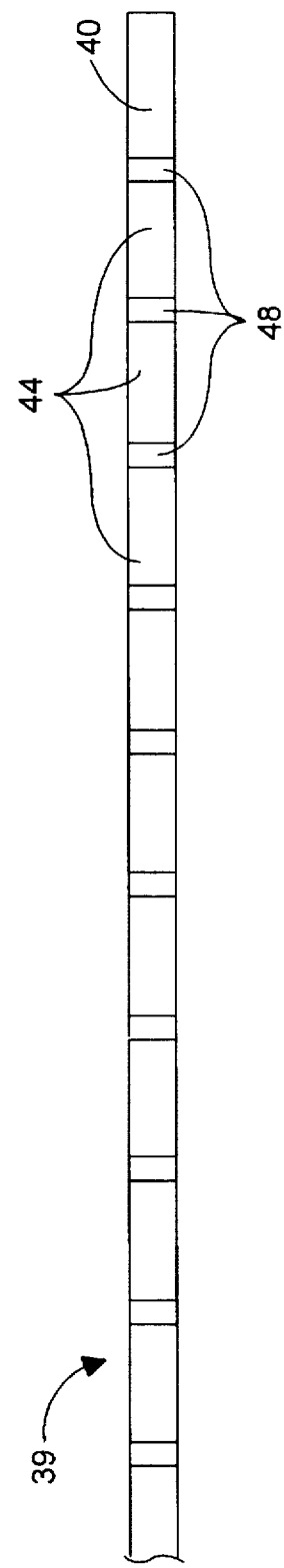
FIG. 4 depicts a serial data stream.

Fig.4 depicts a serial data stream 39 such as might be produced according to the present inventive method. As can be seen in the view of FIG. 4, the serial data stream 39 has a header 40 such as might be added in the add header operation 38 of the serialize operation 34. Next, in a divide into time bites operation 42 (FIG. 3), the formatted data streams 10 are "chopped" into a sequence of data bits referred to herein as "time bites" 44 (FIG. 4). In an add synch character operation 46, a synch character 48 is added in to each of the time bites 44. The synch character 48 will inform the deserializer 32 where each of the time bites 44 begins and ends. Alternative 35 if, for example, in the header 40 the deserializer 32 is informed that each of the time bites 44 will be of a specific length, it might only be necessary to intermittently add the synch character 48 to make certain that the serializer 32 remains synchronized to the serial data stream 39. Finally in the serialize operation, the time bites 44 are transmitted serially in a transmit operation 50 as the serial data stream 39 depicted in FIG. 4. One skilled in the art will recognize that the serialize operation 34 is, in many respects, similar to conventional prior art time base multiplex operations except that, in prior art time base multiplex operations there are hardware or software controls for determining the length of prior art equivalents to the data bites 44, and the like. Since the present inventive interleaving method 30 is intended for network applications which will use a great variety of data formats, including some which are probably not yet even developed, and since it is also intended to communicate between a great variety of hardware types—many of which may not have previously communicated at all, in the absence of the present inventive method 30 there would be no way to "multiplex" the formatted data streams 10 such that they could be "demultiplexed" at the receiving end.

In the deserialize operation 36, where there is a header 40, the header 40 will be read in a read header operation 52 (and appropriate special "set up" accomplished, where required), and the serial data stream 39 is disassembled into the separate formatted data streams 10 in a disassemble operation, with the divisions of the serial data stream 39 occurring either specifically at the synch characters 48, or after time bites 44 of the anticipated lengths have been received, as has been discussed previously herein.

INDUSTRIAL APPLICABILITY

The inventive method for interleaving network traffic over serial links is intended to be widely used wherever it is necessary or desirable to improve data transmission rates over the rates available in conventional formatted data transmission schemes. It is anticipated that there will be a great variety of such applications with transmission distances which range from very short (within a computer unit) to very long (via global transmission means). A modern serial communication transmission medium can transmit data today at up to 700 Mbs full duplex, and in the future will be capable of over 1 Gbs rates. Since this is not a protocol, packet or cell conversion is not required and native ATM or Ethernet traffic, for instance, can be transmitted. The line coding technique is, however, specific to the serial transmission medium.

In the ATM protocol, when there is no data to transmit, idle cells are generated—thereby creating a constant stream of cells at the specified rate. Four 155 Mbs data lines could be interleaved and transmitted over a 700 Mbs line using a time division multiplex technique. The receiving side would demultiplex the data into four separate 155 Mbs lines. Error checking could be performed on the receiving side through the HEC, CRC10 for AAL3/4, or CRC32 for AAL5.

In the Tokin Ring and Ethernet protocols, when there is no data to be transmitted no idle traffic or packets are generated. In an example of multiplexing four 100 Mbs Ethernet streams into a 700 Mbs line between servers, the packets would have to be appended with an additional header denoting which transmitting stream the data originated from. However, if the packets were being transmitted within a system such as a router or hub, the appending extra data is not required because each packet has the addressing data already therein. Again, the multiplexing technique would be utilized to convert the five separate data streams into one for transmission. Since the packets are variable in length, either a trailer would be required to identify the end of the packet or the receiver would search for the unique header identity of the net packet to recognize the end of the current packet.

To transfer data between boards at a short distance within a system such as a router, cabling such as coaxial could be used. For longer distances, such as between computers or network equipment, fiber optic cabling is required. An optical-to-electrical converter can be used to drive the fiber, with the SerialLink transceiver directly interfacing to the optical-to-electrical converter.

Since the inventive method for interleaving network traffic over serial links is readily adaptable for use with existing hardware, and with new hardware just being introduced, and since the method is relatively format independent, it is expected that it will be readily accepted and will find wide usage throughout the computer and digital data transmission industries. For these and other reasons, it is expected that the utility and industrial applicability of the invention will be both significant in scope and long lasting in duration.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

I claim:

1. A method for transmitting data streams of dissimilar packet structure across a serial communication link, comprising:

dividing each of the data streams into a plurality of sequences of data bits of dissimilar length and time duration, wherein at least one of the sequences of data bits comprise a partial byte;

adding a synchronization character proximate to one of said sequences of data bits which has a length and time duration dissimilar from that of the other of said sequences of data bits to provide synchronization to and indication of the dissimilar length and associated time duration thereof; and interleaving the sequences of data bits into a serial data stream, wherein each of the sequences of data bits is selected without regard to the format of the individual data streams.

2. The method of claim 1, wherein the synchronization character is at the beginning of at least some of the sequences of data bits.

3. The method of claim 1, wherein:

each of the sequences of data bits includes a synchronization character.

4. The method of claim 3, wherein:

the synchronization character is at the beginning of each of the sequences of data bits.

5. The method of claim 1, and further including:

adding a header to the combined data stream for informing a receiving end of the length of each of the sequences of data bits.

6. The method of claim 1, wherein:

the quantity of data streams is four.

7. The method of claim 1, and further including:

transmitting the serial data stream through a network; and disassembling the serial data stream into a plurality of individually formatted data streams.

8. In a computer network, a method for transmitting a plurality of formatted data streams over the network, the method comprising:

serializing means for combining the plurality of formatted data streams into a single serial data stream, wherein each of the plurality of formatted data streams is arranged in packets having a format dissimilar from others of said plurality of data streams;

deserializing means for disassembling the serial data stream into the plurality of formatted data streams; wherein the serialization means adds at least one synchronization character to the serial data stream such that the deserialization means can synchronize to and recognize dissimilar lengths and time durations of said formatted data streams and also that the deserialization means will know at what points in the serial data stream to separate the serial data stream into components of the formatted data streams.

9. The method of claim 8, wherein:

the serialization means adds one of the synchronization character to each of a plurality of sequence of data bits, the sequence of data bits each being a sequential portion of one of the formatted data streams.

10. The method of claim 8, wherein:

at least one of the formatted data streams is of a different format than at least one of the others of the formatted data streams.

11. The method of claim 8, wherein:

at least one of the formatted data streams is in SONET format.

12. A network communication apparatus, comprising:

a serializer for serializing a plurality of separate formatted data streams into a serial data stream; and a deserializer for separating the serial data stream into the plurality of separate formatted data streams; wherein the serial data stream includes a plurality of sequences of data bits with each of the sequences of data bits being a time based portion of the formatted data streams, wherein the time based portion is of variable duration which is discerned by a synchronization character preceding each of the sequences of data bits; and the serial data stream includes a header for informing the deserializer of the length of the sequences of data bits.

13. The network communication apparatus of claim 12, wherein:

said synchronization character synchronizes the deserializer to the serial data stream.

* * * * *